United States Patent [19]
Hunt, Jr.

[11] Patent Number: 5,672,136
[45] Date of Patent: Sep. 30, 1997

[54] BALANCE BEAM AUTOMATICALLY ADJUSTING TORQUES TRANSLATOR (STEPLESS VARIABLE TRANSMISSION)

[75] Inventor: Grover C. Hunt, Jr., Northbrook, Ill.

[73] Assignee: Hunts' Serendipity, Inc., Northbrook, Ill.

[21] Appl. No.: 593,272

[22] Filed: Jan. 29, 1996

[51] Int. Cl.$^6$ .................................................. F16H 3/74
[52] U.S. Cl. .......................... 475/255; 475/257; 475/267
[58] Field of Search .................................. 475/255, 257, 475/258, 262, 267

[56] References Cited

U.S. PATENT DOCUMENTS

| | | | |
|---|---|---|---|
| 1,969,683 | 8/1934 | Berry | 475/258 X |
| 2,132,221 | 10/1938 | Ruliancich | 475/255 |
| 2,149,560 | 3/1939 | Teece et al. | 475/267 X |
| 2,590,635 | 3/1952 | McAlister | 475/258 |
| 2,947,202 | 8/1960 | Montalva-Calderon | 475/267 X |
| 3,722,326 | 3/1973 | Dorma | 475/267 X |
| 3,939,734 | 2/1976 | Blanchette et al. | 475/262 |
| 4,848,188 | 7/1989 | Schumacher | 475/267 X |
| 5,397,283 | 3/1995 | Pratolongo | 475/255 X |

*Primary Examiner*—Charles A. Marmor
*Assistant Examiner*—Peter T. Kwon

[57] ABSTRACT

This smoothly automatic changing ratios gear mechanism for use in devices as small as toys and as large as the heaviest industrial machines is an arrangement of planetary gear sets which provide divergent ratio gear tracks driven by an arrangement of components for dynamically positioning virtual fulcrum points along virtual balance beams thus automatically realizing a multiplicity of gear ratios. The gear ratio changes result from the relationship of the amplitude of force driving the system acting against the variable bias of spring and centrifugal forces that tend to keep the fulcrums positioned to affect high RPM output. The gear tracks are arranged as mirror images of each other and in a manner such that the ring gear of an input planetary gear set is tied to the sun gear of an output planetary gear set and vice versa thus forming divergent ratio gear tracks. A low RPM output results from driving the input ring gear and a high RPM output results from driving the input sun gear with virtual fulcrum points impinging upon virtual balance beams so that gear ratios from the highest to the lowest and all the continuum between are possible. Using sun gear to ring gear size ratio of 1/5 provides an output gear ratio ranging from 1/1 to 36/1.

10 Claims, 10 Drawing Sheets

BALANCE BEAM AUTOMATICALLY ADJUSTING TORQUES TRANSLATOR (STEPLESS VARIABLE TRANSMISSION)

BACKGROUND OF THE INVENTION

1. Field of the Invention

This invention relates to the transfer of power from a source to a workload in a range of capacities and speeds resulting from an ability to smoothly and quickly supply a gear ratio that matches input power to load demand.

2. Description of the Prior Art

Machines with this ability use friction cones, variable sheave pulleys, and multiple gear track systems with a method for shifting to the gear ratio that suitably permits the power source to carry the workload. These systems are limited as to the range of power they can be scaled to carry. They are often bulky, heavy and filled with parts and adjustment structures that reduce their efficiency and shorten their life of service. They are subject to shock damage caused by sudden changes in load demand.

SUMMARY

This invention has relatively few parts and most of them are in common use and available from manufacturers. The efficiency and durability of these parts are well established in their field. A simple compact arrangement of divergent ratio gear tracks adjustably controlled by a tension responsive fulcrum and balance beam mechanism makes the invention shock absorbing and therefore shock resistant. Its use of simple proven gearing allows it to be compact, light weight, efficient, durable and inexpensive while providing a smooth selectable spread of gear ratios between its highest and lowest limits. The simple design of the mechanism permits it to be scaled for use with instruments whose power flows are in the fractional horsepower range as well as with industrial mega-horsepower applications. This invention is expected to be especially helpful where a motive force with a broad power capacity, but a limited torquing range is to be connected to a varying load that must be driven at a wide range of speeds. It will also be useful where braking and or power regeneration is needed.

BRIEF DESCRIPTION OF THE DRAWINGS

The drawings will create a better understanding of the invention if action is seen proceeding out of the top of the drawings in FIGS. 1, 4, 10 and in a clockwise direction for all other FIGS. Counter clockwise motion is prevented by antireverse bearings and power moves from input side to output side.

FIG. 5 is a cross sectional view along the 5—5 line of FIG. 1 showing the action parts of the trolley fulcrum

2 positioning disk laid over the input planetary disk with an at rest position indicated by solid lines and with a cruise operating condition indicated by the dotted lines.

DESCRIPTION OF THE PREFERRED EMBODIMENT

Figures 1, 2:
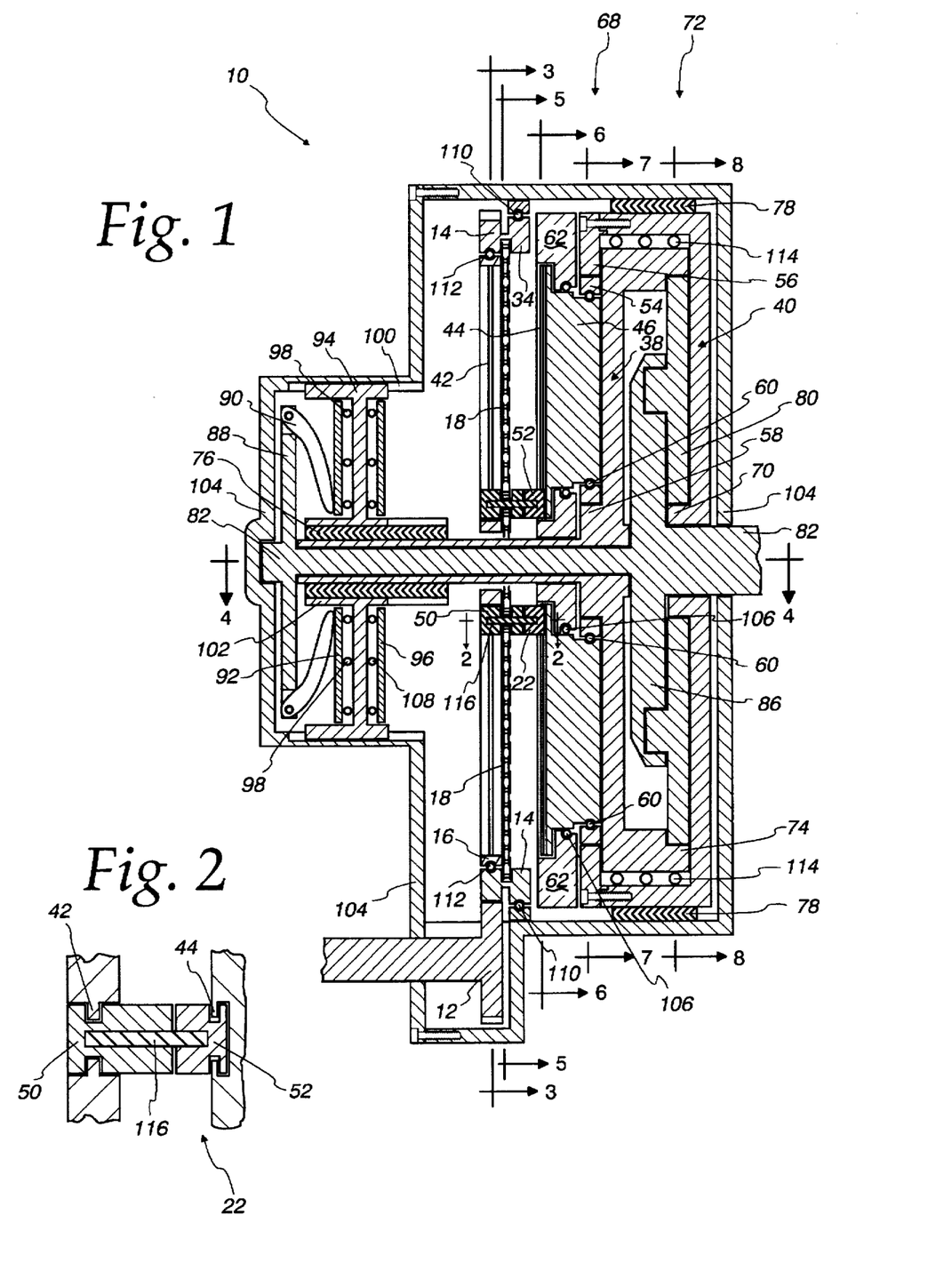
FIG. 1 is a cross sectional drawing of the balance beam automatic transmission which should be viewed with FIG. 4 for a more complete understanding of its elements.
FIG. 2 is a cross sectional view of the trolley fulcrum showing its glides in the track of the trolley fulcrum positioning disk at the left end and in the track of the input planet core at the right end.
Figure 3:
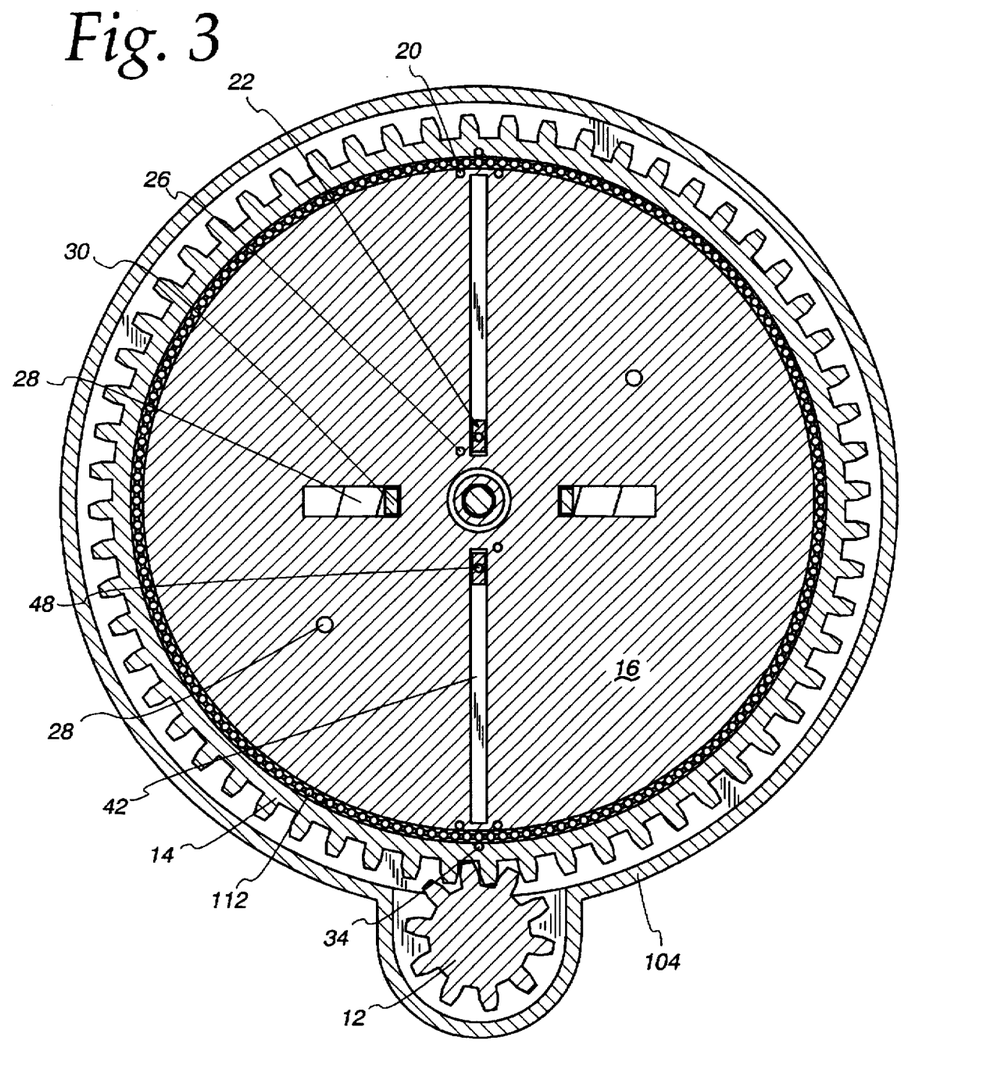
FIG. 3 is a cross sectional view along the 3—3 line of FIG. 1 showing the trolley fulcrum positioning disk and the bearing supporting it in the power ring.
Figure 9:
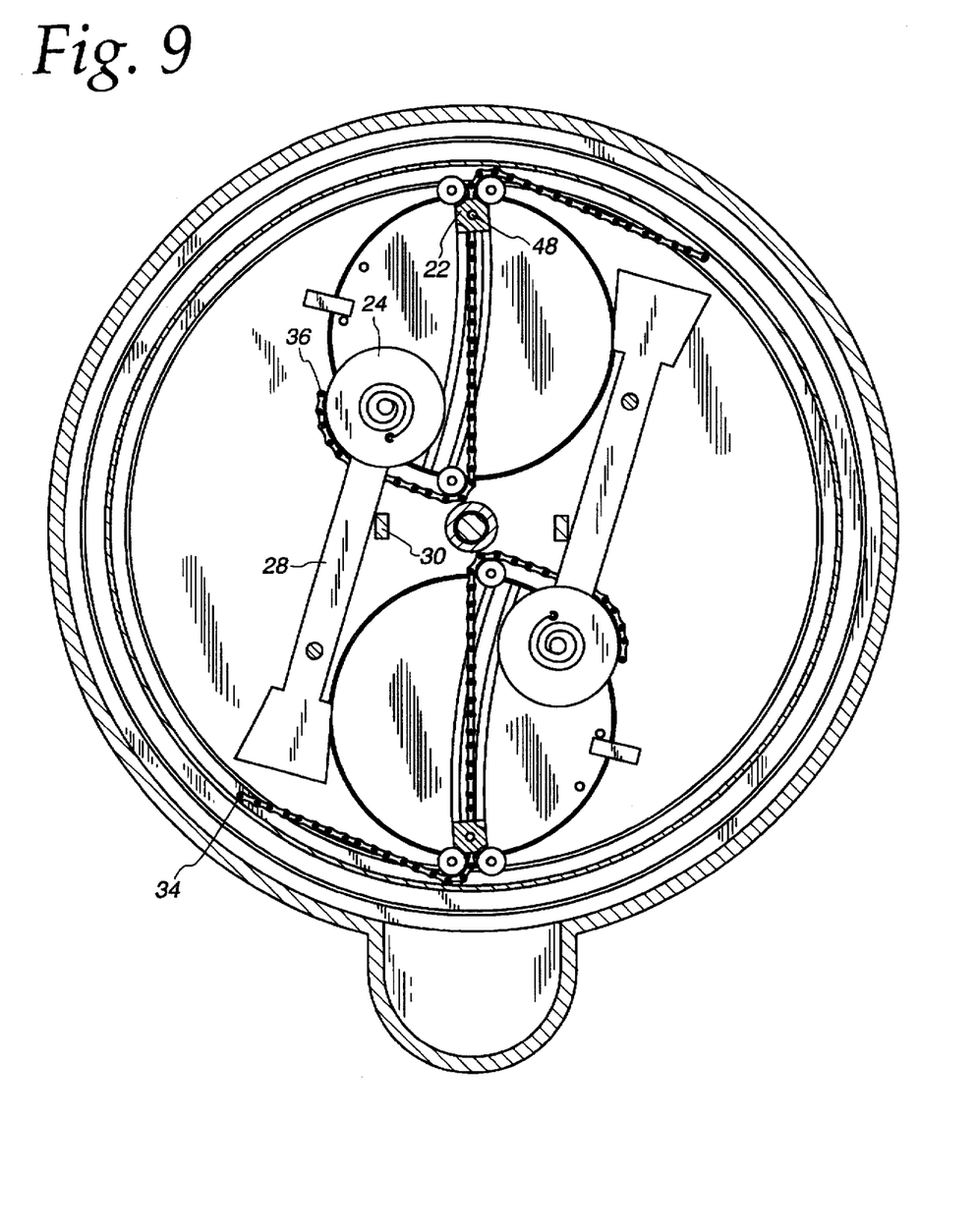
FIG. 9 is a cross sectional view like that of FIG. 5 showing the action parts of the trolley fulcrum positioning disk as they would be during start up or during heavy loading when the output axle RPM is low.

Power for the invention 10 can be introduced by hydrostatic, electromotive, and other methods, but an input gear with axle 12 FIGS. 1, 3 has been chosen for this presentation. The input gear 12 connects with a motive source of torque not shown and meshes with a geared power ring 14 FIGS. 1, 3, 4, 5, 10 rotating within the housing 104 in a bearing 110 FIGS. 1, 3, 4, 10 and in turn passes the power stream to the trolley fulcrum positioning disk 16 which can turn within a ball bearing 112 FIGS. 1, 4, 10 that fixes it in the power ring 14. Power moves to the trolley fulcrum positioning disk 16 as it is pulled along with the power ring 14 by attachment to flexible links 18 FIGS. 1, 5, 9, 11 that extend from the connection points 34 FIGS. 1, 3, 5 in the power ring 14 and are led over roller guides 20 FIG. 5 at the rim of the trolley fulcrum positioning disk 16 and through the trolley fulcrums 22 FIGS. 1, 2, 5, 9 over the roller guides 26 FIGS. 3, 5, 9, 11 at the hub of the trolley fulcrum positioning disk 16 to their connection points 36 FIG. 5 on the take-up reels 24 FIGS. 5, 9, 11. The take-up reels 24, are mounted on pivot arms 28 FIGS. 3, 4, 5, 9, 10, 11 that are counter weighted to be centrifugally neutral. The pivot arms 28 can be caused to move the take-up reels 24 toward their rim area of the trolley fulcrum positioning disk 16 as a result of force applied to them by the trolley fulcrum positioning disk 16 fingers 30 FIGS. 3, 4, 5 as they react to pressure applied to them by the trolley fulcrum tension adjusting assembly 32 FIGS. 4, 10 which by physical location in the drawing are elements 88 through 28 at the left side of the drawing FIG. 4. The take-up reels 24 are spring loaded to cause the trolley fulcrums 22 to be drawn to their hub area of the trolley fulcrum positioning disk 16 and with greater tension when the take-up reels 24 and or the trolley fulcrums 22 have been moved toward their rim area. All the flexible links 18 from the connection points 34 within the power ring 14 to the connection points 36 on the take-up reels 24 lie within the inner circumference of the power ring 14 and rotate in its same plane. Under various loading conditions the connection points 34 can run ahead of or behind the roller guides 20. When loading is heavy the connection points 34 of the flexible links 18 to the power ring 14 will as shown in FIGS. 9, 11 run ahead of the roller guides 20 at the rim of the trolley fulcrum positioning disk 16 and with or behind them as the load lightens and then tends to over-run the motive force. This pulling ahead of or falling behind increases the tension in the flexible links 18 and thereby causes the trolley fulcrums 22 to move away from their hub area and toward their rim area of the trolley fulcrum positioning disk 16 which results in a reduced output RPM/input RPM ratio as compared to the output RPM/input RPM ratio realized when the invention 10 is operating with the trolley fulcrums 22 at their hub position. When used in transportation and other applications where negative loading occurs the invention 10 will provide braking and power regenerating action.

Figure 4:
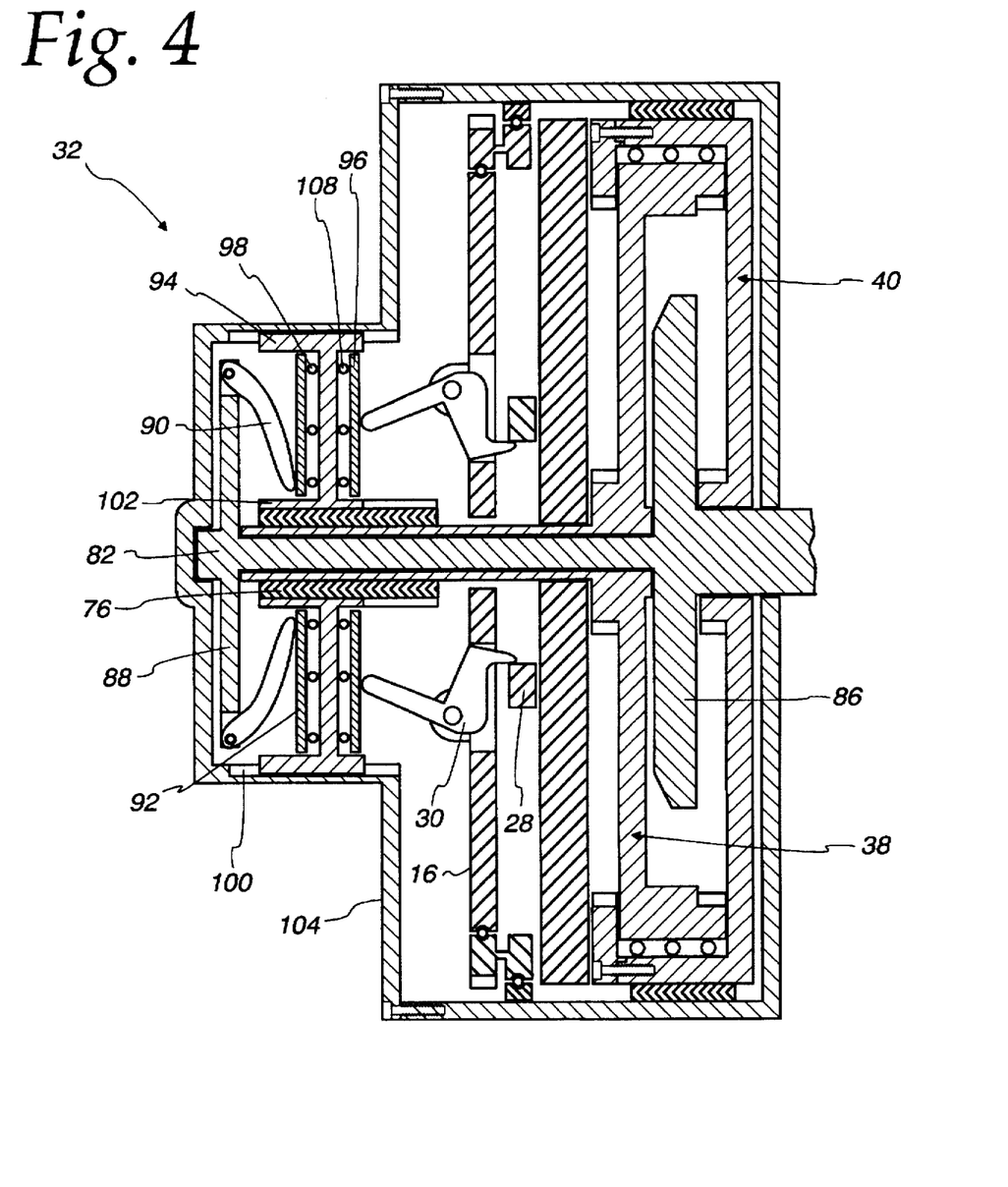
FIG. 4 is a cross is a sectional view along the 4—4 line of FIG. 1 rotated 90 degrees to display elements of the flexible links tension adjusting assembly not seen in FIG. 1 and as at rest or at a low output RPM.
Figure 5:
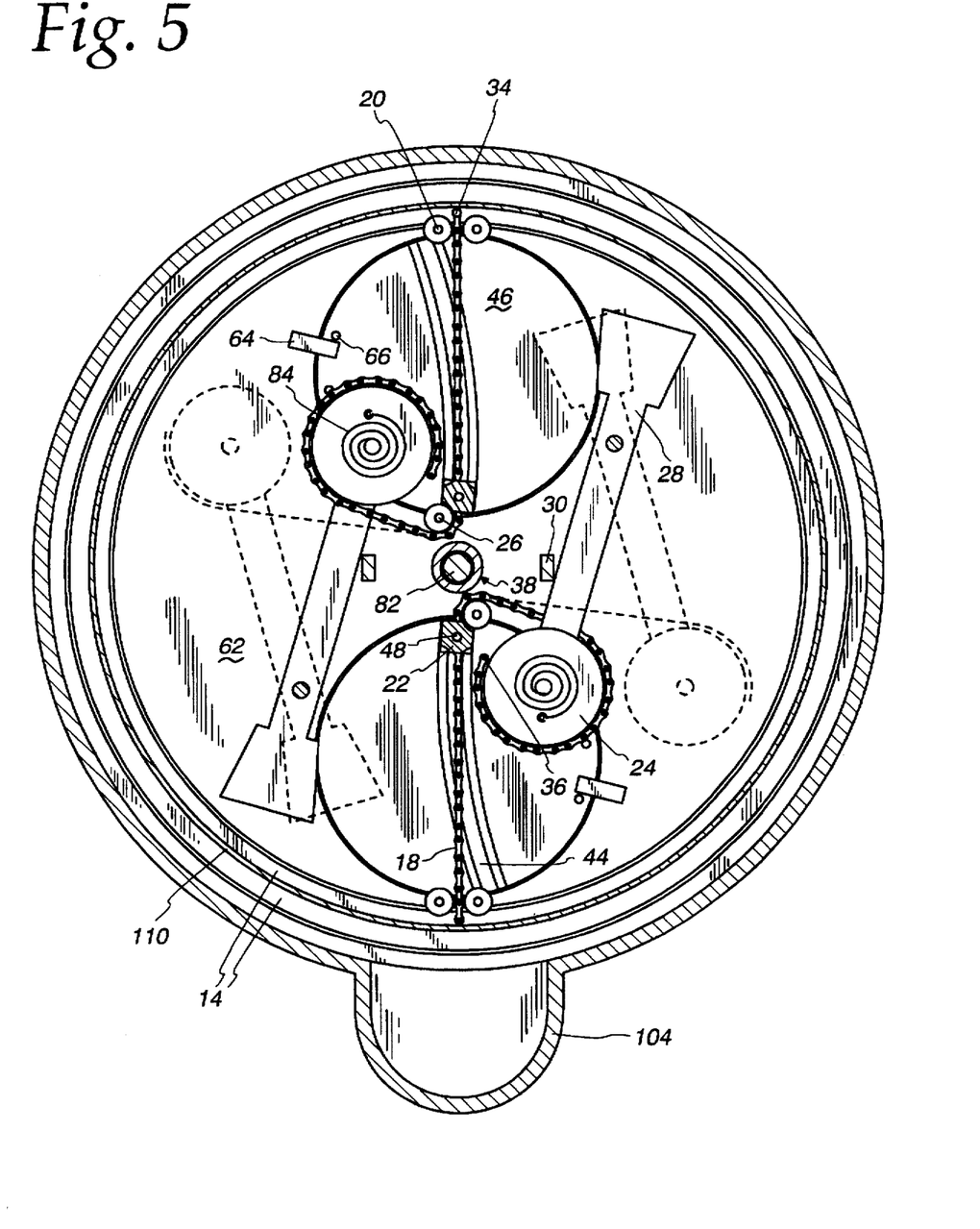
Figure 6:
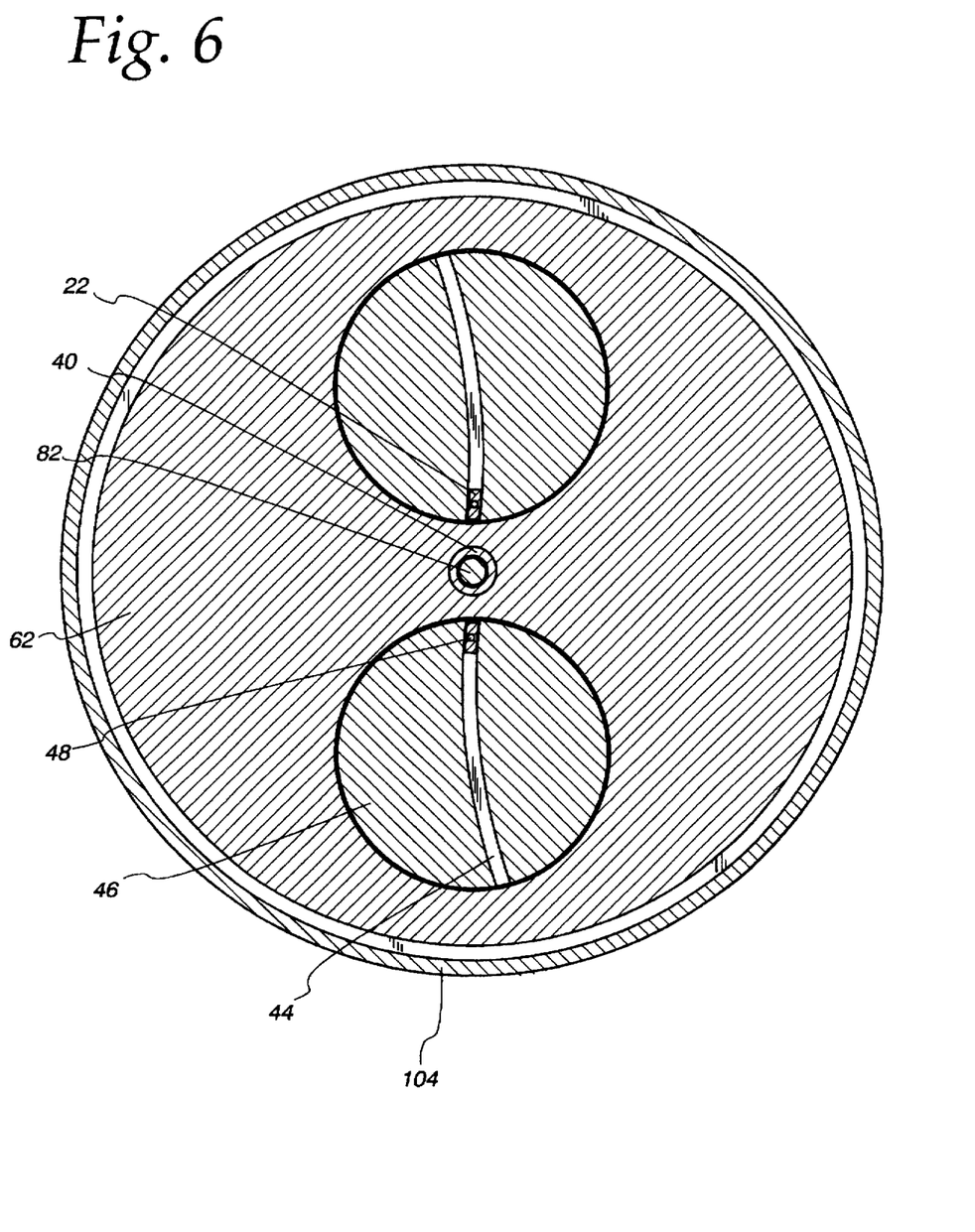
FIG. 6 is a cross sectional view along the 6—6 line of FIG. 1 showing the input planetary disk and its parts as they should be for accord with the parts as depicted in FIGS. 3, 4, 5.
Figure 7:
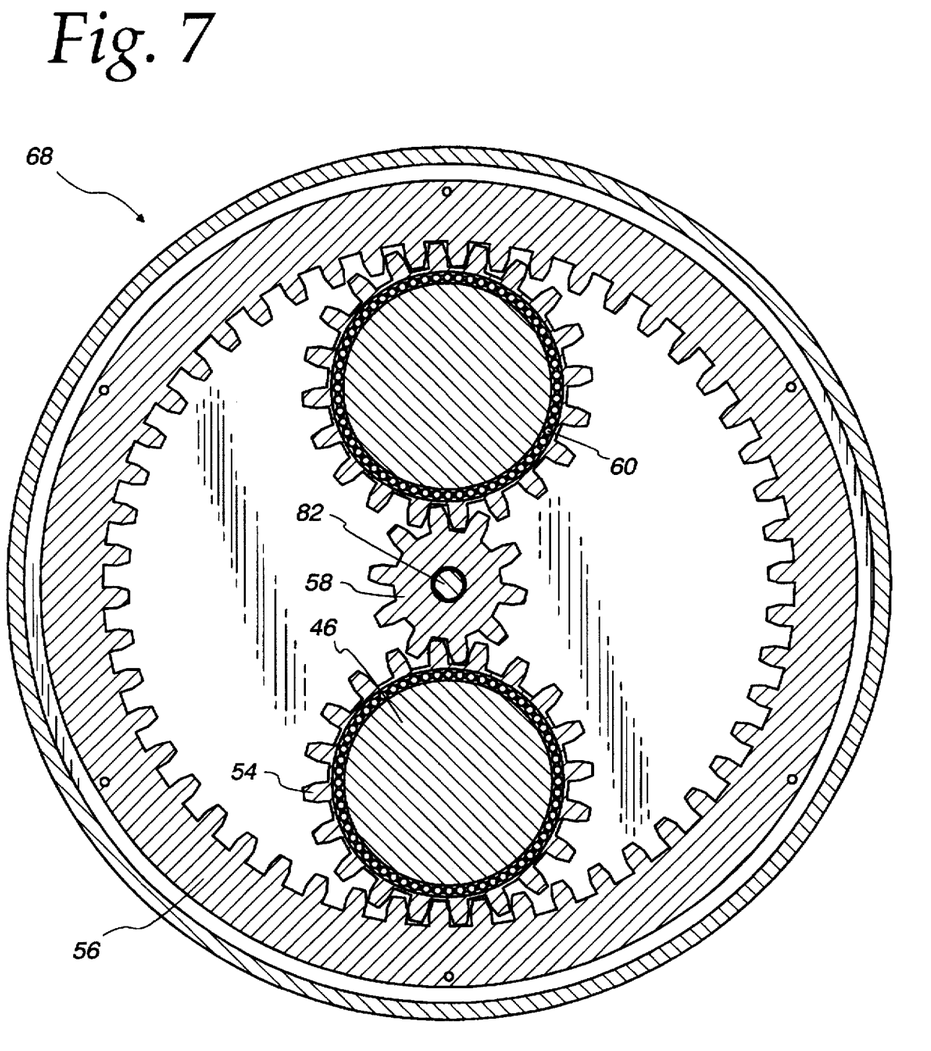
FIG. 7 is a cross sectional view along the 7—7 line of FIG. 1 showing the input planetary gear set with its gear circlet balance beams attached to the planet cores by ball bearings.
Figure 8:
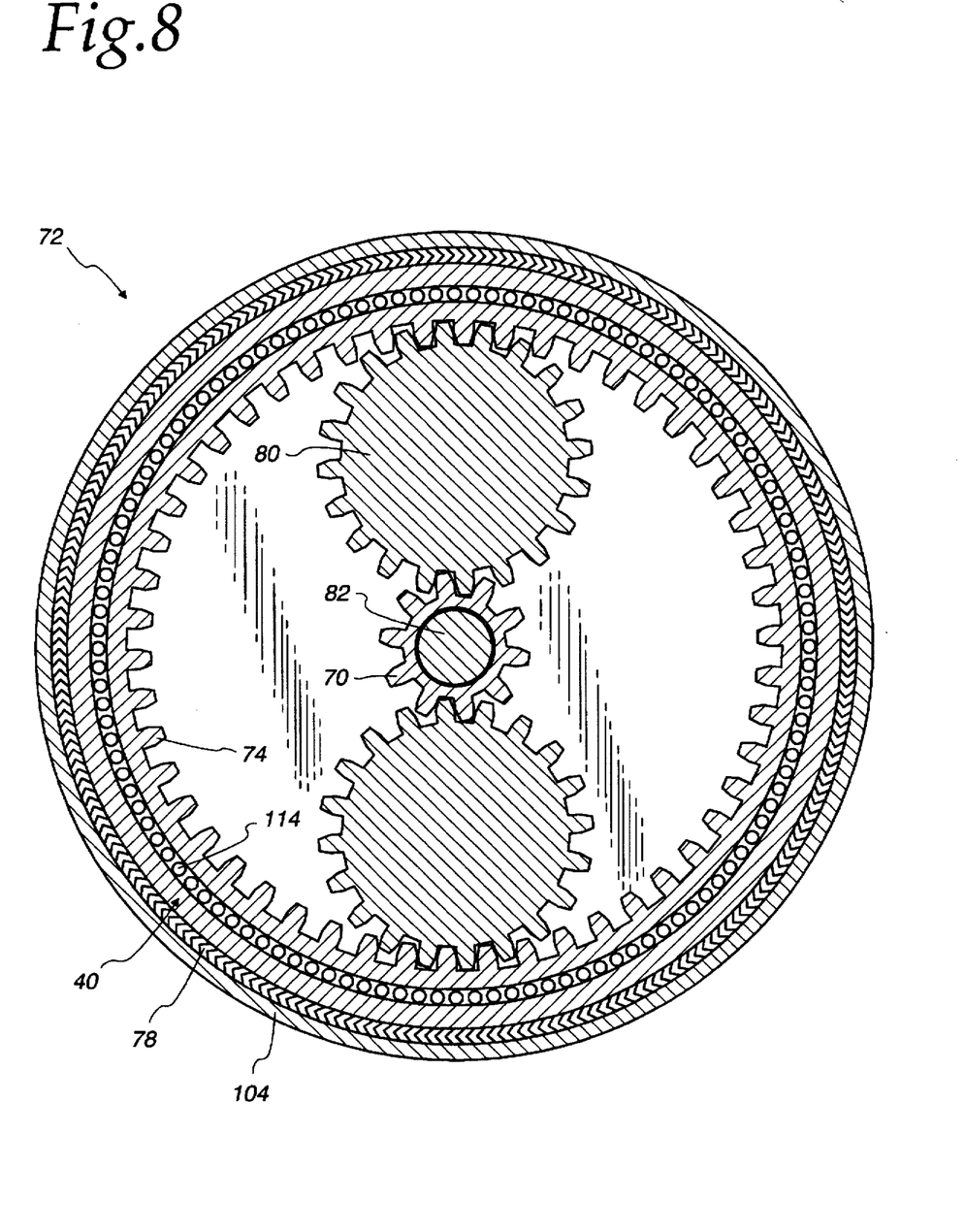
FIG. 8 is a cross sectional view along the 8—8 line of FIG. 1 showing the output planetary gear set and the support bearings for the high and low RPM gear tracks.
Figure 10:
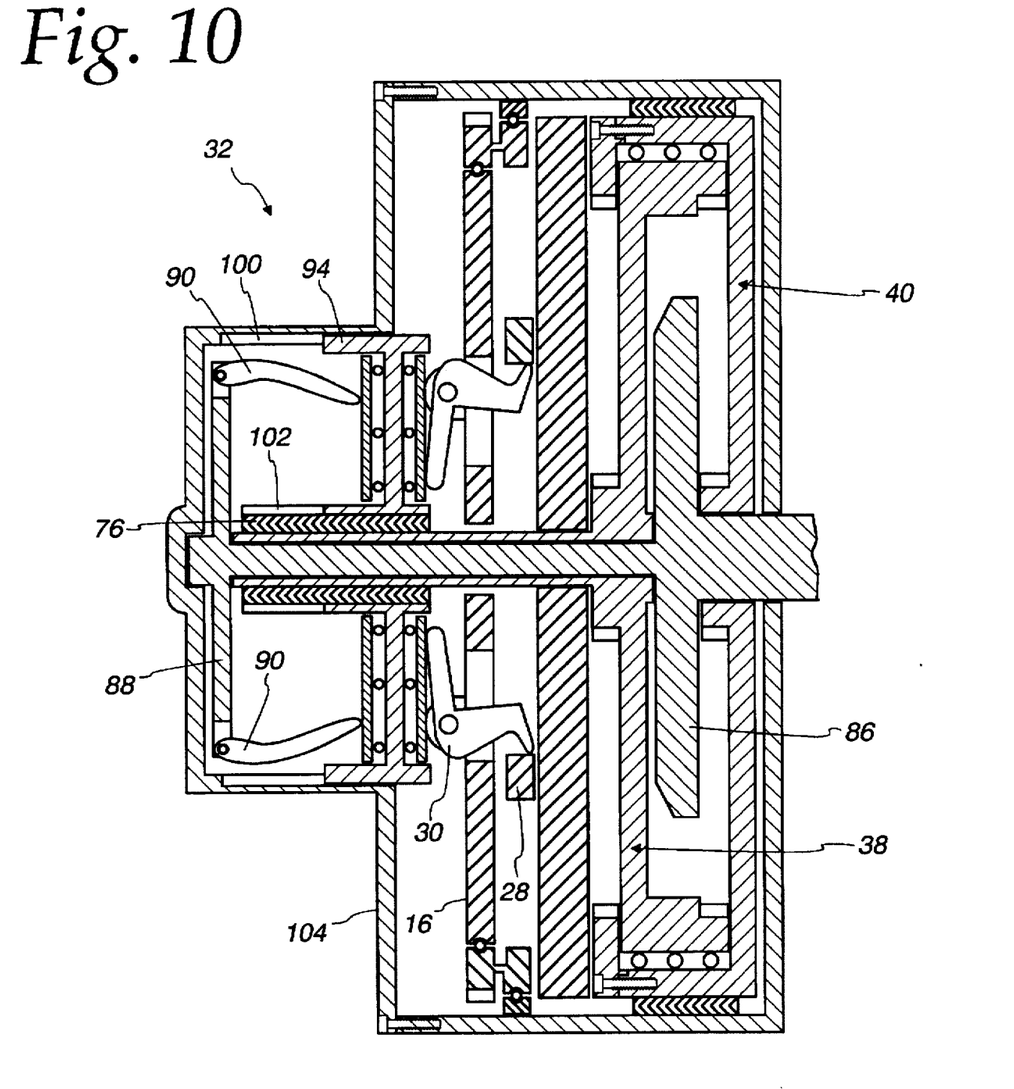
FIG. 10 is a cross sectional view like that of FIG. 4 showing the action parts of the flexible links tension adjusting assembly as they would be during medium loading and high output axle RPM.
Figure 11:
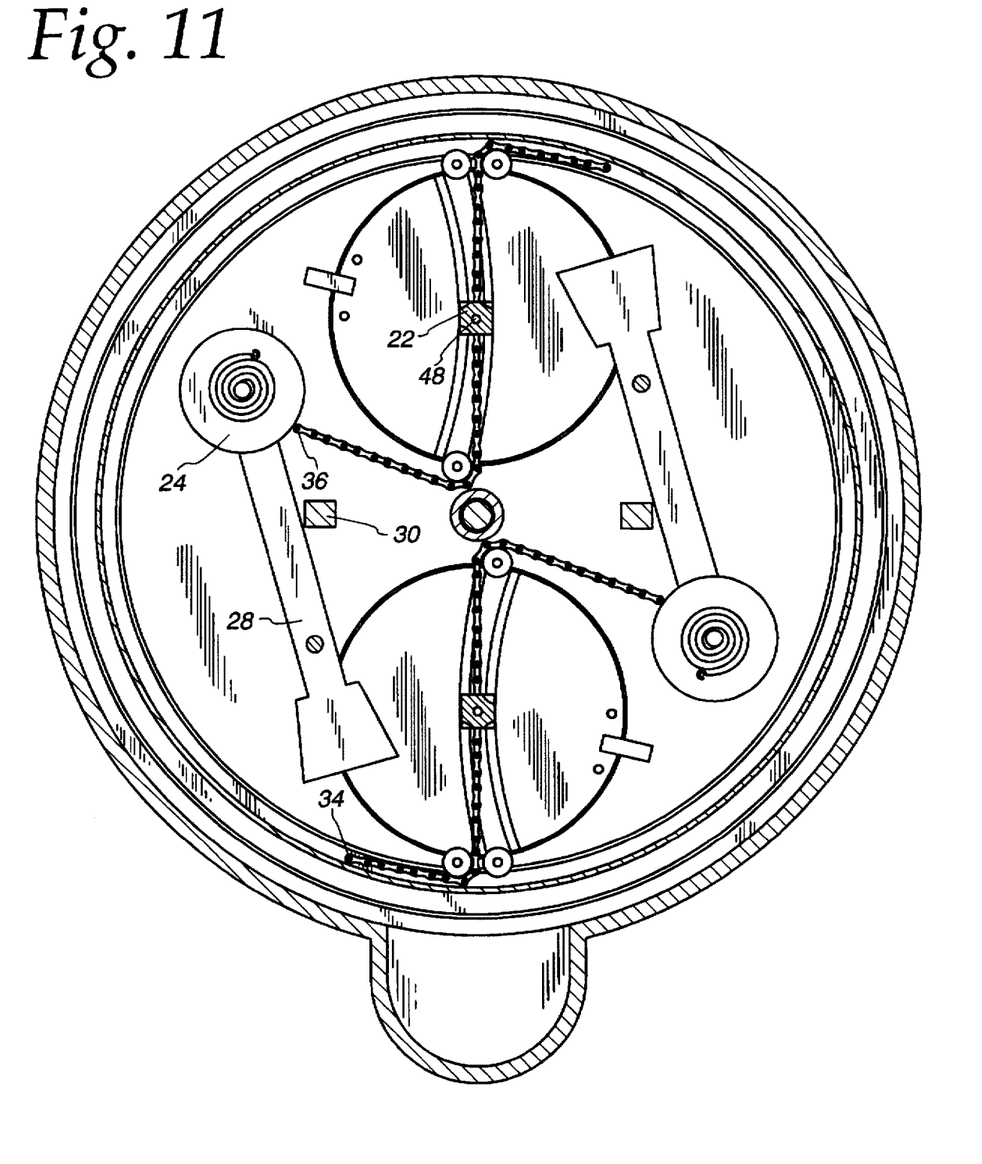
FIG. 11 is a cross sectional view like that of FIGS. 5, 9 showing the action parts of the trolley fulcrum positioning disk as they would be during heavy loading and high output axle RPM.

The trolley fulcrums 22 FIG. 2 are an important part of the mechanism by which the power stream is directed through planet cores 46 FIGS. 5, 6, 7, 9, 11 with gear circlet balance beams 54 FIGS. 1, 7 to a low RPM gear track 40 FIGS. 1, 4, 10 consisting of input ring gear 56 FIGS. 1, 4, 7, 10 connected to output sun gear 70 FIGS. 1, 4, 8, 10 or to a high RPM gear track 38 FIGS. 1, 4, 10 consisting of input sun gear 58 FIGS. 1, 4, 7, 10 connected to output ring gear 74 FIGS. 1, 4, 8, 10 and to the continuum of intermediate ratios according to their position on the tracks 42 FIGS. 1, 2, 3 and 44 FIGS. 1, 5, 6, 9, 11 respectively in the trolley fulcrum positioning disk 16 and the planet cores 46. The high RPM gear track 38 and low RPM gear track 40 are identified in FIGS. 4, 10. The trolley fulcrums 22 are comprised of two pieces held together by a pivot post 116 FIGS. 1, 2 that allows them to freely rotate around the pivot post 116 axis or pivot point 48 FIGS. 3, 5, 6, 9, 11. Therefore the trolley fulcrum glides 50,52 FIGS. 1, 2 can rotate around the axis with no torque in relation to each other. At the ends of the trolley fulcrums 22 are glides 50,52 FIG. 2 that fit into the track 42 of the trolley fulcrum positioning disk 16 and the track 44 of the input planet core 46. This makes a connection of the power stream between the trolley fulcrum positioning disk 16 and the input planet cores 46 that has made an important change. The power stream has been changed from a torque force to a vector force. The vector force has the amplitude of the power flowing from the trolley fulcrum positioning disk 16 and moves in the operating direction on the tangent line determined by the position of its trolley fulcrum's pivot point 48 on the circumference of the circle being inscribed by the pivot point 48 at a given moment. This vector force acting through the pivot points 48 moves along the track 44 FIG. 6 of the input planet cores 46 according to the dynamics of the forces acting on the trolley fulcrums 22 through the trolley fulcrum positioning disk 16. It is at the hub position when the tension provided by flexible links tensioning assembly 24 & 28 FIGS. 5, 9, 11 is stronger than the motive force, it is at the rim position when the motive force is stronger than the tension force and it is otherwise located any place where the two forces are equal along the trolley fulcrum positioning disk 16 tracks 42 and therefore any place along the planet cores 46 tracks 44. A virtual balance beam is provided as a gear circlet balance beam 54 FIG. 7 whose teeth mesh into the teeth of the input ring gear 56 and into the teeth of the input sun gear 58 and which is the race of a ball bearing 60 attached to the planet core 46 FIG. 7. It is important to realize that the input gear circlet balance beam 54 is free to turn in either direction on its ball bearing 60 without having any torque influence on and without any torque influence from the input planet core 46 carrying it and therefore without any torquing of the input planetary disk 62 FIGS. 5, 6 in which the input planet core 46 is carried. The planet core 46 is set in a ball bearing 106 FIG. 1 of the input planetary disk 62 and therefore can turn in relation to its planetary disk 62 but only through an arc limited by a stop 64 on the input planetary disk 62 FIG. 5 and two posts 66 on the planet core 46 FIG. 5. The planet core track 44 FIG. 6 is curved to keep the pivot point 48 FIGS. 3, 5, 6, 9, 11 always at the intersection of the tangent line and the radius line of the circle being followed and its posts 66 prevent it from slipping past the radius line where the gear teeth mesh when operating at the rim or hub extremes of its travel. Prepare to superimpose one figure over another figure as in FIG. X/FIG. Y when that notation appears in the next few statements. When the pivot point 48 behaving as a fulcrum in relation to the meshed teeth of the gear circlet balance beam 54 is at the rim area FIG. 9/FIG. 7 of the input planetary disk 62 the vector force it carries is directly in line with the tangent of the circle whose circumference passes through the contact area of the teeth of the gear circlet balance beam 54 and the teeth of the input ring gear 56 of the input planetary gear set 68 FIG. 7 consisting of input ring gear 56, gear circlet balance beam 54 and input sun gear 58 and therefore directs all its energy to moving the ring gear 56 teeth in the operating direction. The vector force is on the tangent line of the meshing area FIG. 5/FIG. 7 of the gear circlet balance beam 54 gear teeth with the input sun gear 58 teeth when the pivot point 48 is at the hub area of the input planetary disk 62 and therefore directs all its energy to moving the sun gear 58 teeth in the operating direction. This high RPM output will not always move the load, but it is quickly changed to a lower RPM output by a motive force increase that is greater than the tension force. At all the positions where the pivot point 48 might come to rest FIG. 11/FIG. 7 along the planet core track 44 its virtual fulcrum vector is directed along the tangent of the circumference of its inscribing circle. The teeth of the gear circlet balance beam 54 are always in mesh with the teeth of the input ring gear 56 and the teeth of the input sun gear 58 of the input planetary gear set 68. This condition along with its freedom to rotate in either direction on its ball bearing 60 gives the gear circlet balance beam 54 the effect of being a continuous balance beam. It reacts as a balance beam to the vector force of the virtual fulcrum thus passing the power stream in ratios from 0% to 100% alternately and in every combination onto the input ring 56 and the input sun 58 gears. The ring gear 56 of the input planetary gear set 68 FIG. 7 is tied to the sun gear 70 FIG. 8 of the output planetary gear set 72 FIG. 8 consisting of output ring gear 74, output planet gear 80 FIGS. 1, 8 and output sun gear 70 and the sun gear 58 of the input planetary gear set 68 is tied to the ring gear 74 of the output planetary gear set 72 and with antireversing bearings 78 FIGS. 1, 4, 8, 10 and 76 FIGS. 1, 4, 10 supporting the elements of their respective gear tracks 40 and 38 we get a low output RPM/input RPM ratio when the pivot point 48 is at the rim area and a high output RPM/input RPM ratio when the pivot point 48 is at the hub area. The input side of this double and mirrored pair of planetary gear tracks 38 and 40 provides a unique input planetary gear set 68 because of the way the power stream is transferred to the ring 56 and sun 58 gears by the virtual fulcrum of the pivot point 48 and the gear circlet balance beam 54. The output side of these gear tracks 38 and 40 is like any planetary gear set 72 whose planet gear 80 is driven singly, alternately, and in every combination of the two by its ring 74 and sun 70 gears and moves power through its output planetary disk 86 FIG. 8 to an integral output axle 82 FIGS. 1, 3, 4, 5, 7, etc.

For the performance of the invention 10 it is important to provide tension for the flexible links 18 that will throughout the desired performance range draw the trolley fulcrums 22 to their hub area of the trolley fulcrum positioning disk 16 that is approximate to but less than equal to the force that can be applied by the motive source. This will assure an ability to draw the trolley fulcrums 22 into a position where the gear ratio will be lowered and heavy loading can be handled within the torque range of the motive source. It will be helpful to provide a way of adjusting the tension during operation and should be understood that the tension and its adjustment could be handled by electromagnetic, hydrostatic, levered and other adjustment methods. For this presentation an adjustable coil spring 84 FIGS. 5, 9, 11 flexible links tensioning assembly 24 & 28 FIGS. 5, 9, 11 and a flexible links tension adjusting assembly 32 FIGS. 4, 10 are provided.

The take-up reels 24 of the trolley fulcrum positioning disk 16 have coil springs 84 FIG. 5 that can be adjusted for the amount of tension needed to keep the invention 10 operating at cruise and normal running conditions but at start up the motive source may need a reduced tension to allow its start up strength to move the trolley fulcrums 22 to their rim area of the trolley fulcrum positioning disk 16 where maximum gear reduction is realized. For this reason a flexible links tension adjusting assembly 32 FIGS. 4, 10 has been included. Its purpose is to permit the take-up reels 24 to rest at their hub area when there is low output RPM and then move them to their rim area as the output RPM increases, note the solid and dotted lines of the flexible links tensioning assembly 24 & 28 FIG. 5. These tension values are dynamic and must be related to the output characteristics of the motive source. The tension adjustment is accomplished as output axle 82 FIG. 4 RPM increases by causing pressure on the fingers 30 of the trolley fulcrum positioning disk 16 which act on the take-up reel 24 pivot arms 28 to cause the take-up reels 24 to move from their hub area to their rim area of the trolley fulcrum positioning disk 16. This lengthens the distance to be spanned by the flexible links 18 which increases the spring tension of the take-up reels 24. This happens as a result of the connection of the tension activating disk 88 FIGS. 1, 4, 10 to the output axle 82 of the invention 10. The tension activating disk 88 has weighted fingers 90 FIGS. 1, 4, 10 which by centrifugal force press against the input platter 92 of the slip plate 94 which is part of the flexible links tension adjusting assembly 32 FIGS. 4, 10. This platter 92 and the companion platter 96 on the output side of the slip plate 94 are held by ball bearings 98 and 108 respectively that permit the platters 92 and 96 and the fingers 30 and 90 that are pressing against them to turn at different RPMs while communicating and equalizing the pressures of the fingers 30 and 90 from both sides to each other. This pressure equalization is possible because the slip plate 94 can travel toward and away from the trolley fulcrum positioning disk 16 in grooves 100 of the housing 104 and grooves 102 of the outer race of the antireversing bearing 76 FIGS. 1, 4, 10. The slip plate 94 also ties the outer race of the antireversing bearing 76 to the housing 104 and thereby prevents reverse rotation by gear track 38. As the output axle 82 RPM increases the centrifugal pressure of the activating fingers 90 increases until the fingers 90 reach the limit of their travel which should be adjusted to occur when the total tension in the flexible links 18 approximates the lower range of efficient force available from the motive source. It will therefore be possible to increase speed or load handling ability by applying more force which in itself would have that affect but also because the greater force will move the trolley fulcrums 22 away from the hub position thus creating a lowered gear ratio For this patent proposal it is realized that those familiar with the manufacture of transmission devices will quickly recognize the possibilities for enhancing this presentation such as by adding a clutch to connect and disconnect the power source, and to connect and disconnect the load, a reverse gear, the extension of the output axle through the input side of the housing, relocation of the take-up reels, the substitution of controllable clutches for the antireversing bearings, changes in the gear track types and ratios and different glide track configurations as well as enhancement of the High RPM gear track bias with levers, cranks, hydrostatic, and electromotive, methods. All these and other types of enhancement are expected to be within the scope of this invention. The embodiment presented was selected for its compact simplicity, operating efficiency, scalability, and overall practicality.

I claim:

1. A power transfer device transfering power from a source to a workload in a manner providing a continuum of intermediate ratios between its highest RPM ratio and lowest RPM ratio limits, comprising;

a means for aligning and supporting said power transfer device elements while allowing power input and power output, a means for providing a fulcrum and a balance beam positioned and held for receiving power and passing it to divergent ratio power tracks, a means for providing and holding said divergent ratio power tracks in a manner such that said tracks will with inverse portionallity be receiving a determined range of said power from said balance beam, a means for receiving said power from said source and passing it to said fulcrum, a means for holding said fulcrum and its power transfer at a determined range continuum of points along said balance beam, a means for holding said balance beam that allows it to be continuously receiving said power from said fulcrum and passing it to said power tracks, a means for controlling said power tracks reactions to the power forces, a means for receiving said power forces from said power tracks and passing said power to said workload.

2. A power transfer device transferring power from a source to a workload in a manner providing a continuum of intermediate ratios between its highest RPM ratio and lowest RPM ratio limits and automatically adjusting RPM ratio multiples in response to dynamic tension changes resulting from variations of loading, speed, and strength of the power source, comprising;

a housing allowing power input and power output while aligning and supporting said power transfer device elements therin, power input device connecting to said power source and to rotatable power ring, said power ring connecting to said power input device and connecting to a set of flexible links, said set of flexible links with trolley fulcrums attached connecting said power ring to a set of flexible links tensioning assemblies, a trolley fulcrum positioning disk with glide tracks for a set of trolley fulcrum glides, guides for said flexible links and with said set of flexible links tensioning assemblies connecting to said set of flexible links and being held rotatably within the circumference of and in the plane of said power ring, said set of trolley fulcrums with glides at each end attached to said flexible links and connecting said trolley fulcrum positioning disk to a set of planet cores, said set of planet cores continuously receiving said power from said trolley fulcrums and continuously passing it to a set of gear circlet balance beams which in turn are continuously passing said power to divergent ratio gear tracks, an arrangement of an interconnected input gear set with an output gear set providing a controlled action arrangement of said divergent ratio gear tracks, an output axle as an integral part of an output gear driven by said power tracks and connecting to a flexible links tension adjusting assembly, said flexible links tension adjusting assembly connecting to said output axle and applying increasing pressure with increasing output RPM and urging said flexible links tensioning assemblies toward increased tension positions.

3. A power transfer device as recited in claim 2 having said input device that is an input gear with axle.

4. A power transfer device as recited in claim 2 with said power ring providing connection points for said set of flexible links and geared and rotatably mounted in said housing receiving power from said input gear and supporting rotatably within its inner circumference said trolley fulcrum positioning disk.

5. A power transfer device as recited in claim 2 with said set of flexible links connecting from said connection points in said power ring through said guides on said trolley fulcrum positioning disk, through said attached trolley fulcrums and to said connection points on said flexible links tensioning assemblies and as a result of interactive tensions between said flexible links tensioning assemblies and said power source causing said trolley fulcrum positioning disk to rotate nearly syncronously with said power ring and positioning said trolley fulcrums between the hub and rim areas of said trolley fulcrum positioning disk and said planet cores.

6. A power transfer device as recited in claim 2 with said trolley fulcrum positioning disk whose said glide tracks are adjustable and whose said flexible links tensioning assemblies are a set of pivot arms that hold a set of spring loaded take-up reels that are adjusted to apply tension approximate to but never equal to the tension available from said power source and with said flexible links connection points all receiving power from said power ring by attachment to said flexible links then passing it onto said trolley fulcrums and by the interaction of tension from said take-up reels with tension from said power source positioning said trolley fulcrums between its hub and rim areas so that acting as fulcrums they impress the power along said set of gear circlet balance beams at a position that will affect the proper RPM ratio to enable said power to carry said workload.

7. A power transfer device as recited in claim 2 with said set of trolley fulcrums whose ends are glides that are connected rotatably by pivot posts providing pivot points and by attachment to said flexible links action glide to and fro in tracks provided by said trolley fulcrum positioning disk and by said planet cores of said input gear set thus connecting the power from said trolley fulcrum positioning disk tracks to the tracks of said planet cores and in the process changing the power received as a torque force into a vector force passing to said planet cores and said gear circlet balance beams in the manner of a fulcrum to a balance beam.

8. A power transfer device as recited in claim 2 providing said set of planet cores with trolley fulcrum glide tracks and carrying said set of freely rotatable gear circlet balance beams and mounted for limited rotation in said input gear set receiving power from said trolley fulcrums and transferring it by said gear circlet balance beams to said set of divergent ratio gear tracks.

9. A power transfer device as recited in claim 2 in which said arrangement of interconnected gear sets are of the planetary type wherein the sun gear of said input gear set is tied to the ring gear of said output gear set and the ring gear of said input gear set is tied to the sun gear of said output gear set thus providing said divergent ratio gear tracks receiving within an adjustable determined range and with inverse portionallity said power from said gear circlet balance beams and passing it to said output axle.

10. A power transfer device as recited in claim 2 with said flexible links tension adjusting assembly that is an arrangement of a rotatable platter on the input side and a rotatable platter on the output side of a slip plate allowing the pressure reactive parts of said flexible links tension adjusting assembly and the pressure reactive parts of said flexible links tensioning assemblies to feel and equalize their pressure differences thus applying variable tension resulting from centrifugal action and as an RPM mismatch isolation device communicating it to said trolley fulcrum tensioning assemblies and positioning said trolley fulcrums for effective operation of said power transfer device.

* * * * *